(12) United States Patent
Liu et al.

(10) Patent No.: US 7,726,036 B2
(45) Date of Patent: Jun. 1, 2010

(54) CONTOUR MEASURING PROBE

(75) Inventors: Qing Liu, Shenzhen (CN); Jun-Qi Li, Shenzhen (CN); Takeo Nakagawa, Tokyo (JP)

(73) Assignees: Hong Fu Jin Precision Industry (ShenZhen) Co., Ltd., Shenzzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 171 days.

(21) Appl. No.: 11/966,951

(22) Filed: Dec. 28, 2007

(65) Prior Publication Data

US 2009/0007449 A1   Jan. 8, 2009

(30) Foreign Application Priority Data

Jul. 6, 2007   (CN) ........................ 2007 1 0201023

(51) Int. Cl.
*G01B 5/20* (2006.01)
*G01B 5/00* (2006.01)

(52) U.S. Cl. .......................................... 33/556; 33/503
(58) Field of Classification Search ................... 33/556, 33/557, 558, 559, 560, 561, 502, 503, 1 M
See application file for complete search history.

(56) References Cited

U.S. PATENT DOCUMENTS

| | | | | |
|---|---|---|---|---|
| 4,117,601 A | * | 10/1978 | Kober et al. | 33/561 |
| 4,389,781 A | * | 6/1983 | Donaldson | 33/1 M |
| 4,507,868 A | * | 4/1985 | Tuss | 33/1 M |
| 4,799,316 A | * | 1/1989 | Tuss | 33/503 |
| 4,835,871 A | * | 6/1989 | Pesikov | 33/1 M |
| 4,899,456 A | * | 2/1990 | Morita et al. | 33/561 |
| 4,949,465 A | * | 8/1990 | Pesikov | 33/1 M |
| 4,964,221 A | * | 10/1990 | Breyer et al. | 33/503 |
| 5,208,994 A | * | 5/1993 | McMurtry et al. | 33/561 |
| 6,295,866 B1 | * | 10/2001 | Yamamoto et al. | 73/105 |
| 6,397,485 B1 | * | 6/2002 | McMurtry | 33/503 |
| 6,829,838 B1 | * | 12/2004 | Weekers et al. | 33/702 |
| 7,398,603 B2 | | 7/2008 | Liu et al. | |

FOREIGN PATENT DOCUMENTS

| | | | |
|---|---|---|---|
| CN | 1987350 A | | 6/2007 |
| DE | 4408912 A1 | * | 12/1994 |
| DE | 10326247 A1 | * | 1/2005 |
| EP | 0072314 A1 | | 2/1983 |
| JP | 57073601 A | * | 5/1982 |
| JP | 2009023025 A | * | 2/2009 |

\* cited by examiner

*Primary Examiner*—R. A. Smith
(74) *Attorney, Agent, or Firm*—Frank R. Niranjan

(57) ABSTRACT

An exemplary contour measuring probe includes a guide (12), a movable rack, a counter-balancing mechanism, a linear measuring scale (24), and a displacement sensor (26). The movable rack comprises a tip extension (20) for touching a surface of an object. The tip extension (20) is pushed to move towards the object under a gravitational force acting on the movable rack. The counter-balancing mechanism is configured to partially counter balance the gravitational force acting on the movable rack. The linear measuring scale (24) displays values of displacements of the tip extension (20). The displacement sensor (26) detects and reads the displacement values displayed by the linear measuring scale (24).

17 Claims, 14 Drawing Sheets

CONTOUR MEASURING PROBE

CROSS-REFERENCE TO RELATED APPLICATIONS

This application is related to nine co-pending U.S. patent applications, which are: application Ser. No. 11/611,724, filed on Dec. 15, 2006, and entitled "DISTANCE MEASURING PROBE WITH AIR DISCHARGE SYSTEM", application Ser. No. 11/843,664, filed on Aug. 23, 2007, and entitled "CONTOUR MEASURING DEVICE WITH ERROR CORRECTING UNIT", application Ser. No. 11/966,952, and entitled "CONTOUR MEASURING PROBE", application Ser. No. 11/966,957, and entitled "CONTOUR MEASURING METHOD FOR MEASURING ASPECTS OF OBJECTS", application Ser. No. 11/966,964, and entitled "MEASURING DEVICE FOR MEASURING ASPECTS OF OBJECTS", application Ser. No. 11/966,961, and entitled "MEASURING DEVICE AND METHOD FOR USING THE SAME", application Ser. No. 11/966,959, and entitled "BASE AND CONTOUR MEASURING SYSTEM USING THE SAME", and application Ser. No. 11/966,954, and entitled "CONTOUR MEASURING PROBE FOR MEASURING ASPECTS OF OBJECTS". In Ser. No. 11/611,724, Ser. No. 11/843,664, the inventors are Qing Liu, Jun-Qi Li, and Takeo Nakagawa. In Ser. Nos. 11/966,961, 11/966,964, 11/966,959, and 11/966,952, the inventors are Qing Liu and Jun-Qi Li. In Ser. No. 11/966,954, the inventors are Jian-bin Kong and Qing Liu. In Ser. No. 11/611,724 and Ser. No. 11/843,664, the assignee is Hon HAI PRECISION INDUSTRY CO. LTD and FINE TECH Corporation, and the assignee of other applications is HONG FU JIN PRECISION INDUSTRY (ShenZhen) CO., LTD and Hon HAI PRECISION INDUSTRY CO. LTD. The disclosures of the above identified applications are incorporated herein by reference.

BACKGROUND OF THE INVENTION

1. Field of the Invention

The present invention relates generally to contour measuring probes for coordinate measuring machines (CMMs); and more particularly to a contour measuring probe using a relatively small measuring force for contact-type contour measuring devices.

2. Discussion of the Related Art

Manufactured precision objects such as optical components (for example, aspherical lenses) and various industrial components need to be measured to determine whether manufacturing errors of the objects are within acceptable tolerance. Such manufacturing errors are the differences between the design dimensions of the object and the actual dimensions of the manufactured object. Measured dimensions of the manufactured object are usually regarded as the actual dimensions. A precision measuring device is used to measure the objects; and the more precise the measuring device, the better. Generally, the precision objects are measured with a CMM, which has a touch trigger probe that contacts the objects. A measuring force applied to the touch trigger probe of the coordinate measuring machine should be small. If the measuring force is too great, a measuring contact tip of the touch trigger probe may be easily damaged thereby causing a measuring error.

As indicated above, a contact-type coordinate measuring device is commonly used to measure dimensions of precision objects such as optical components and certain industrial components. A relatively large measuring force is provided to the touch trigger probe by the coordinate measuring device. However, if the object has a slanted surface, the contact tip of the touch trigger probe may become bent or deformed by a counterforce acting on the touch trigger probe, thereby causing a measuring error. Therefore, the touch trigger probe is not ideal for measuring precision lenses having slanted surfaces.

Therefore, a contour measuring probe employing a relatively small measuring force is desired.

SUMMARY

An exemplary contour measuring probe includes a guide, a movable rack, a counter-balancing mechanism, a linear measuring scale, and a displacement sensor. The movable rack comprises a tip extension for touching a surface of an object. The tip extension is pushed to move towards the object under a gravitational force acting on the movable rack. The counter-balancing mechanism is configured to partially counter balance the gravitational force acting on the movable rack. The linear measuring scale displays values of displacements of the tip extension. The displacement sensor detects and reads the displacement values displayed by the linear measuring scale.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present contour measuring probe. Moreover, in the drawings, like reference numerals designate corresponding parts throughout the several views.

DETAILED DESCRIPTION OF THE EMBODIMENTS

Figure 1:
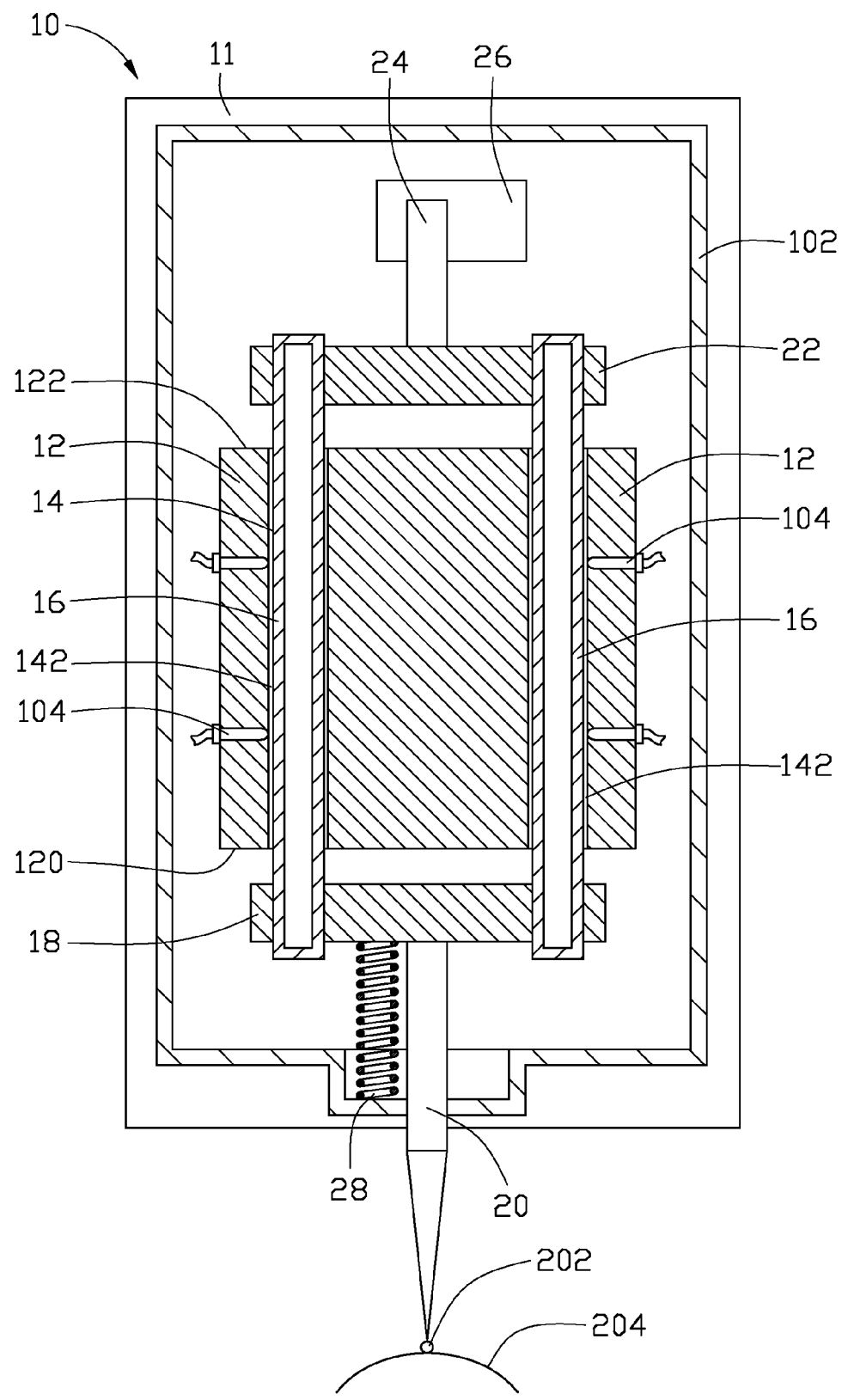
FIG. 1 is a top plan, cross-sectional view of a contour measuring probe in accordance with a first embodiment of the present invention.

Referring to FIG. 1, a contour measuring probe 10 of a first embodiment of the present invention includes a base 11, a guide 12, two driving members 16, a first frame 18, a tip extension 20, a second frame 22, a linear measuring scale 24, a displacement sensor 26, a cover 102, a resilient member 28, and a plurality of tubes 104. In alternative embodiments, the contour measuring probe 10 may include only one driving member 16 or more than two driving members 16. The driving members 16, the first and second frames 18, 22, the tip extension 20, and the linear measuring scale 24 cooperatively form a movable rack (not labeled). A gravitational force acting on the movable rack is regarded as a measuring force of the contour measuring probe 10. The gravitational force acting on the movable rack pushes the tip extension 20 to move towards an object 204.

The base 11 is substantially a flat rectangular sheet. It should be understood that the base 11 may alternatively have other suitable shapes. The guide 12 is mounted securely onto the base 11. The guide 12 has a bottom end 120 and a top end 122. The guide 12 defines two chutes 14 each extending from the bottom end 120 to the top end 122. The chutes 14 are spaced apart from and aligned parallel to each other. In alternative embodiments, the guide 12 may define only one chute 14 or more than two chutes 14, corresponding to the number of driving members 16.

Each of the driving members 16 is a hollow cylinder with two sealed ends. Each of the driving members 16 runs through the corresponding chute 14 of the guide 12. One end of each driving member 16 protrudes out from the bottom end 120 and is fixed onto the first frame 18. The other end of each driving member 16 protrudes out from the top end 122 and is fixed onto the second frame 22. An outer diameter of the driving members 16 is configured to be smaller than a diameter of the chutes 14, so that a gap (not labeled) is defined between each driving member 16 and the guide 12. Air is pumped into the gap between the driving members 16 and the guide 12. Therefore, an air bearing 142 is formed between each of the driving members 16 and the guide 12 when the gaps are filled with air. The air pumped into the gap between the driving members 16 and the guide 12 may be replaced by any other suitable kind of gas such as oxygen, nitrogen, etc. The driving members 16 are made of one of stainless steel, aluminum (Al), titanium (Ti), and carbon steel. In alternative embodiments, each driving member 16 may be a hollow cylinder with two open ends, or a solid cylinder.

The tip extension 20 is needle-shaped, and has a contact tip 202 that touches the object 204 when the contour measuring probe 10 is used to measure the object 204. The tip extension 20 is fixed onto the first frame 18 so that the tip extension 20 is linearly movable together with the movable rack. The linear measuring scale 24 is fixed onto the second frame 22 such that it moves (displaces) linearly when the movable rack moves. The displacement sensor 26 is mounted on the base 11 corresponding to the linear measuring scale 24. The displacement sensor 26 is used for reading displacement values of the linear measuring scale 24. Alternatively, the positions of the linear measuring scale 24 and the displacement sensor 26 may be exchanged.

The cover 102 engages with the base 11 and completely encloses the various other components of the contour measuring probe 10. The cover 102 defines an opening (not labeled) for allowing a part of the tip extension 20 to extend out therefrom. The tubes 104 are perpendicularly disposed in a guide 12 relative to driving members 16. That is, an angle defined by extension directions of the tubes 104 relative to the axis of the driving members 16 is equal to 90 degrees. The tubes 104 are spaced parallelly from each other and communicate with chutes 14 defined in the guide 12 correspondingly. When air is pumped into the tubes 104, the chutes 14 eject air between the guide 12 and the driving members 16 out of the guide 12. The cover 102 and the base 11 would then be filled with the air ejected out of the guide 12. As a result, a pressure inside the cover 102 is kept higher than that of the environment outside the cover 102. Thus, dust and other particles are prevented from entering the cover 102 through any openings thereof.

The resilient member 28 is a counter-balancing mechanism of the contour measuring probe 10. In this embodiment, the resilient member 28 is a columnar spring. An extending direction of the resilient member 28 is parallel to a direction of gravity and the resilient member 28 is disposed and compressed between the first frame 18 and the cover 102. That is, the resilient member 28 generates a resilient force having a direction parallel to the direction of gravity. The resilient member 28 is used to partially counter balance the gravitational force acting on the movable rack.

In use, the contour measuring probe 10 is placed near the object 204. The pipes tubes 104 communicate with an air chamber (not shown), and air is pumped into the gap between the driving members 16 and the guide 12 via the tubes 104. Therefore, an air bearing 142 is formed between the driving members 16 and the guide 12. The gravitational force acting on the movable rack pushes the tip extension 20 to move towards the object 204. The resilient member 28 between the cover 102 and the first frame 18 is compressed and generates a resilient force opposite to the gravitational force. The resilient force generated from the resilient member 28 partially counter balances the gravitational force acting on the movable rack. As a result, a force applied on the contact tip 202 of the tip extension 20 is relatively small so that the contact tip 202 gently touches the object 204. As a result, the contact tip 202 of the tip extension 20 and the object 204 cannot easily be deformed or damaged, and a measuring precision of the contour measuring probe 10 is very high. When the contact tip 202 of the tip extension 20 touches the object 204, the tip extension 20 of the movable rack stops moving. When the tip extension 20 and the linear measuring scale 24 move from one position to another position, the displacement sensor 26 detects and reads a displacement of the linear measuring scale 24.

Alternatively, the resilient member 28 is a hollow sleeve and is sleeved on the tip extension 20 between the first frame 18 and the cover 102. In such cases, two ends of the resilient member 28 resist or are fixed to the cover 102 and the first frame 18 respectively. In alternative embodiments, the contour measuring probe 10 may include two or more resilient members 28. The resilient member 28 is compressingly disposed so as to provide a force to partially counter balance the gravitational force acting on the movable rack.

Figure 2:
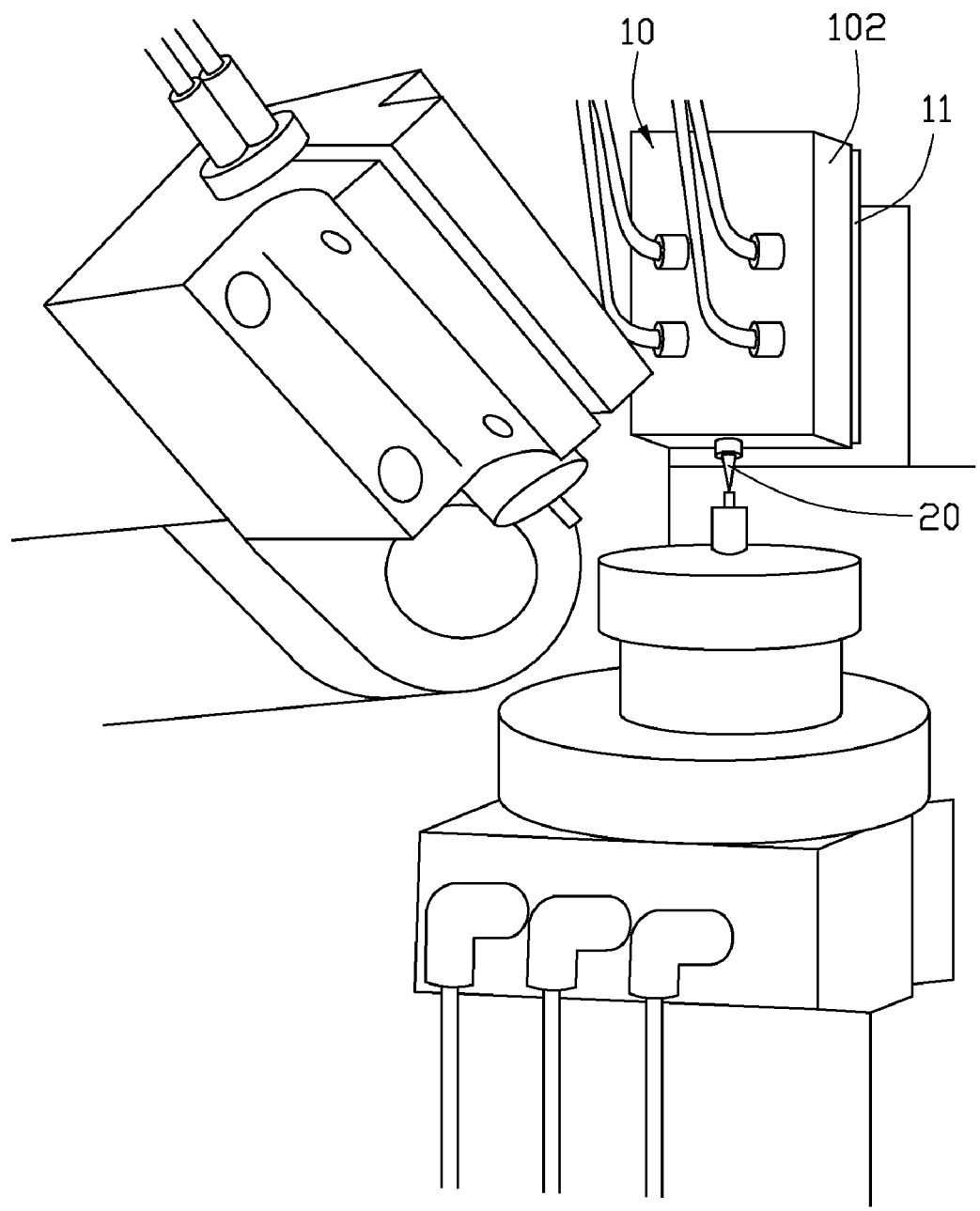
FIG. 2 is an isometric view of an exemplary application of the contour measuring probe of FIG. 1.

In manufacturing precision components such as optical lenses, the optical lenses generally need to be machined again if they do not fall within specified tolerances of shape and dimension. Referring to FIG. 2, the contour measuring probe 10 is applied in very high precision equipment for manufacturing optical lenses. The optical lenses are measured on the same piece of equipment immediately after being machined. Therefore, there are no errors caused by releasing the optical lenses from a machining equipment and reclamping the optical lenses on a measuring machine. Further, more time can be saved. Generally, the manufacturing time can be reduced by as much as ⅕ or even ⅓. The high precision equipment includes a master actuator that moves the contour measuring probe 10 along at least one direction. That is, the master actuator can be a single-axis actuator, a double-axis actuator, a triple-axis actuator, or can be another kind of driving master actuator.

The contour measuring probe 10 is connected to a processor (not shown). The master actuator of the high precision equipment, the contour measuring probe 10, and the processor cooperatively form a coordinate measuring machine. Supposing that a surface of the object 204 (e.g., an optical lens) is manufactured according to predetermined 3D (three-dimensional) coordinate surface values. When the tip extension 20 touches the object 204, the displacement sensor 26 sends the displacement values of the tip extension 20, according to the readout from the linear measuring scale 24, to the processor. The processor records and manages the values.

Figure 3:
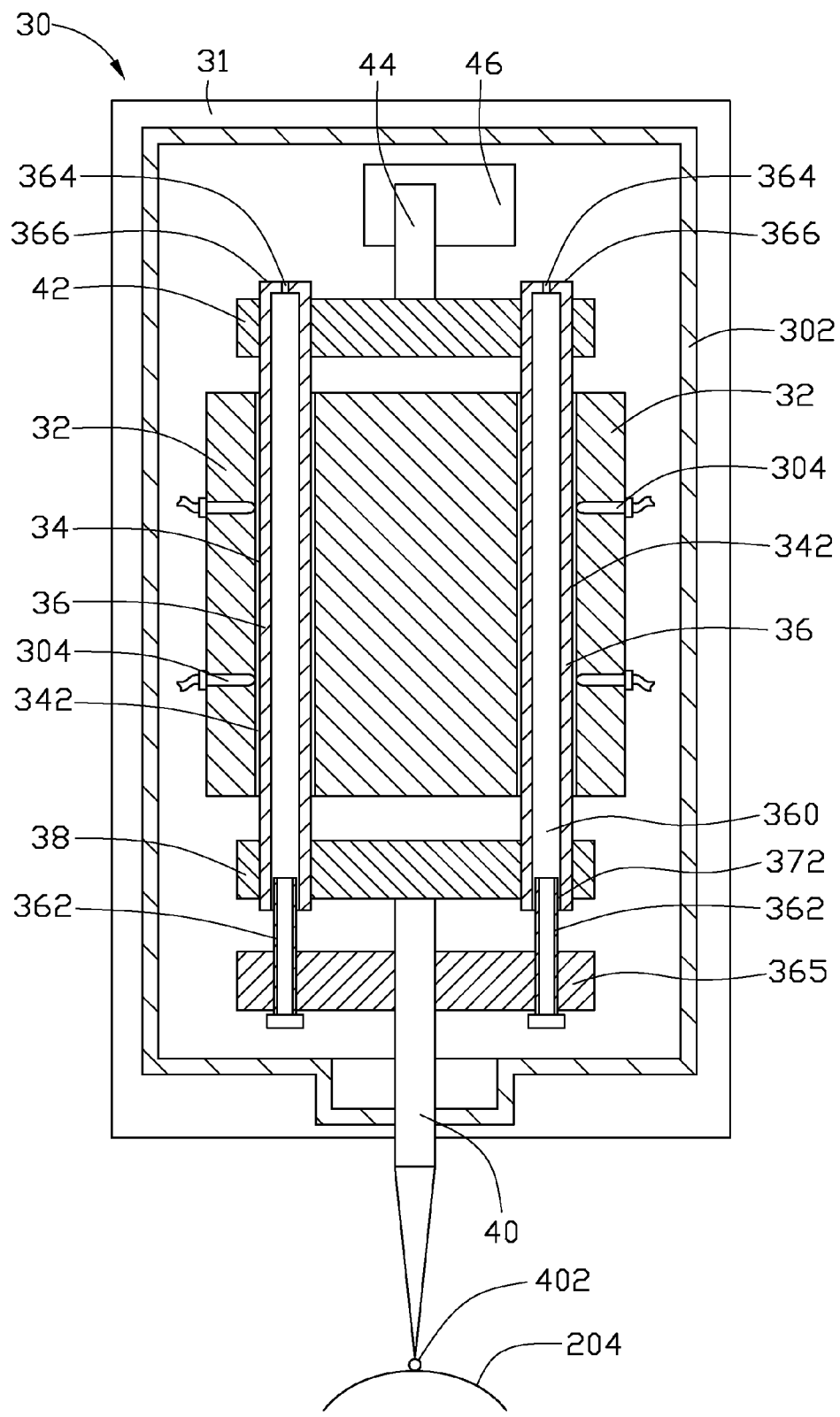
FIG. 3 is a top plan, cross-sectional view of a contour measuring probe in accordance with a second embodiment of the present invention.

Referring to FIG. 3, a contour measuring probe 30 of a second embodiment of the present invention includes a base 31, a guide 32, two driving members 36, a first frame 38, a tip extension 40, a second frame 42, a linear measuring scale 44, a displacement sensor 46, a cover 302, a plurality of tubes 304, two pipes 362, and a pipe holder 365. The driving members 36, the first and second frames 38, 42, the tip extension 40, the tubes 304, and the linear measuring scale 44 corporatively form a movable rack (not labeled). A gravitational force acting on the movable rack is regarded as a measuring force of the contour measuring probe 30. In alternative embodiments, the contour measuring probe 30 may include only one driving member 36 or more than two driving members 36. In such cases, there may be only one pipe 362 or more than two pipes 362 corresponding to an amount of the driving members.

The guide 32 is mounted securely on the base 31. Two chutes 34 are defined in the guide 32. The chutes 34 are spaced apart from and parallel to each other. Each of the driving members 36 is a cylinder defining a cavity 360 that extends through the driving member 36 from a bottom open end to a top cylinder base 366 of the driving member 36. Each driving member 36 is received in a corresponding chute 34. An outer diameter of the driving members 36 is configured to be smaller than a diameter of the chutes 34, so that a gap (not labeled) is defined between each driving member 36 and the guide 32. Air is pumped into the gap between the driving members 36 and the guide 32 via the tubes 304. Thus, an air bearing 342 is formed between the driving members 36 and the guide 32 when the gaps are filled with air.

The contour measuring probe 30 is similar to the contour measuring probe 10 except that a counter-balancing mechanism of the contour measuring probe 30 does not include the resilient member 28, but includes the pipes 362 for allowing air to be pumped into the cavity 360 of each of two driving members 36. The driving members 36 are disposed at a bottom end of the driving members 36. A flowing direction of air pumped into the driving members 36 is contrary to a direction of the gravitational force acting on the movable rack. Therefore, a pushing force of the air partially counter balances the gravitational force acting on the movable rack.

Each of the pipes 362 is partially inserted into the bottom open end of the driving member 36 correspondingly. An outer diameter of the pipes 362 is smaller than a diameter of the cavities 360 of the driving members 36, so that a gap 372 is defined between each pipe 362 and the corresponding driving member 36. An air bearing (not labeled) is formed between each pipe 362 and the corresponding driving member 36 when air is pumped into the cavities 360 of the driving members 36 via the pipes 362. Therefore, friction forces between the driving members 36 and the guide 32, and between the pipes 362 and the driving members 36, are significantly small. The result is that the driving members 36 can move in the chutes 34 smoothly. It should be understood that the gaps between the pipes 362 and the driving members 36 may be omitted. Alternatively, lubricant may be provided between the pipes 362 and the driving members 36 to reduce friction forces.

The pipe holder 365 is fixed on the base 31 under the first frame 38. The pipe holder 365 is configured to hold the pipes 362 in position. When air is pumped into the cavities 360 of the driving members 36, an air current inside the cavities 360 creates a pushing force that partially counter balances a gravitational force acting on the movable rack of the contour measuring probe 30. Thereby, the tip extension 40 is driven by a small force. The air pumped into the cavities 360 of the driving members 36 is partly ejected out of the driving members 36 by an air discharge system 364.

Figure 4A:
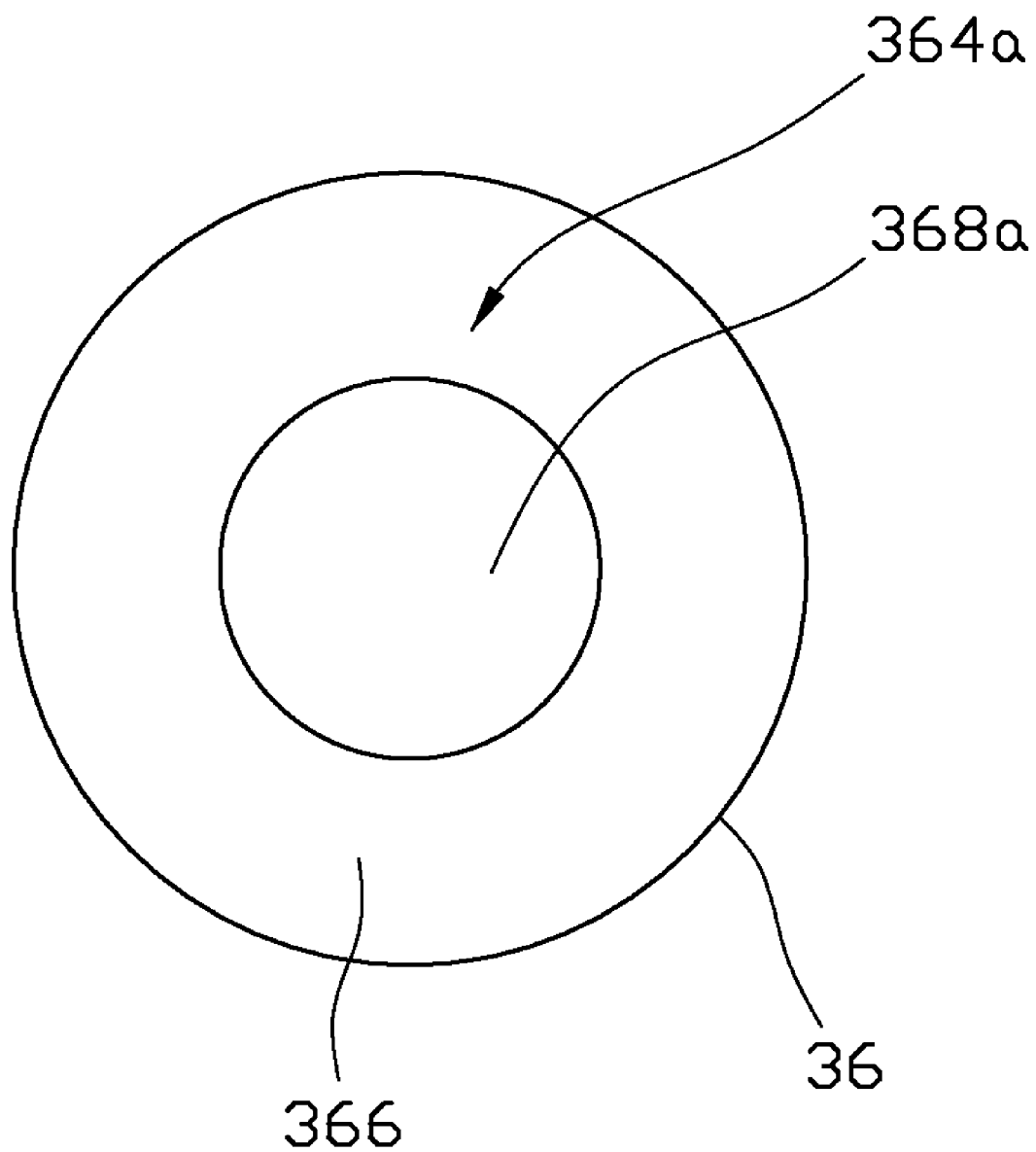
FIG. 4A is an enlarged, top plan view of an air discharge system of the contour measuring probe of FIG. 3, showing a first embodiment of the air discharge system.
Figure 4B:
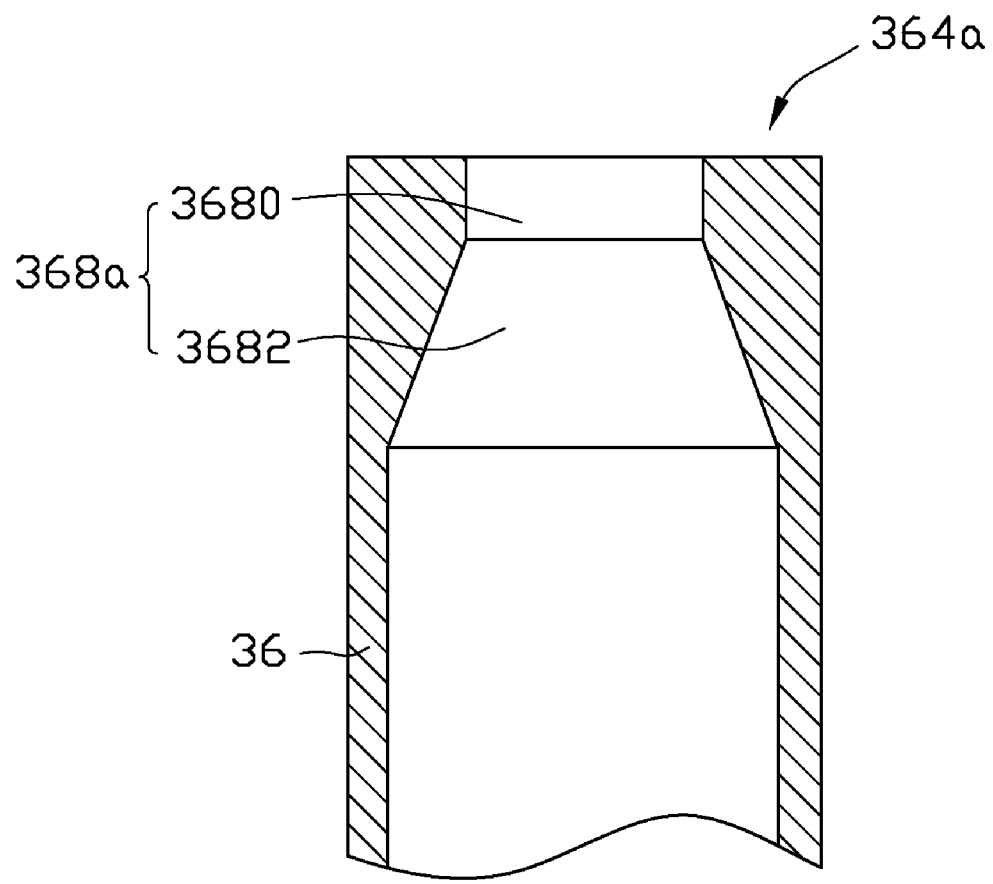
FIG. 4B is an enlarged, longitudinal cross-sectional view of a top end portion of one of the driving members of FIG. 3, showing the first embodiment of the air discharge system.

The following describes a plurality of exemplary embodiments of the air discharge system 364 of the contour measuring probe 30. Referring to FIGS. 3-4B, a first embodiment of an air discharge system 364a includes an air eject hole 368a defined in a center of the cylinder base 366 of each driving member 36. The air eject hole 368a includes a top cylindrical portion 3680 and a frustum portion 3682. The frustum portion 3682 intercommunicates with the top cylindrical portion 3680 and the cavity 360. A diameter of the top cylindrical portion 3680 is equal to a smallest diameter of the frustum portion 3682. The frustum portion 3682 defines a conical frustum shape, with a radius of the conical frustum gradually decreasing from the cavity 360 to the top cylindrical portion 3680. Thereby, air can flow smoothly out of the driving member 36 through the air eject hole 368a of the air discharge system 364a.

Figure 5A:
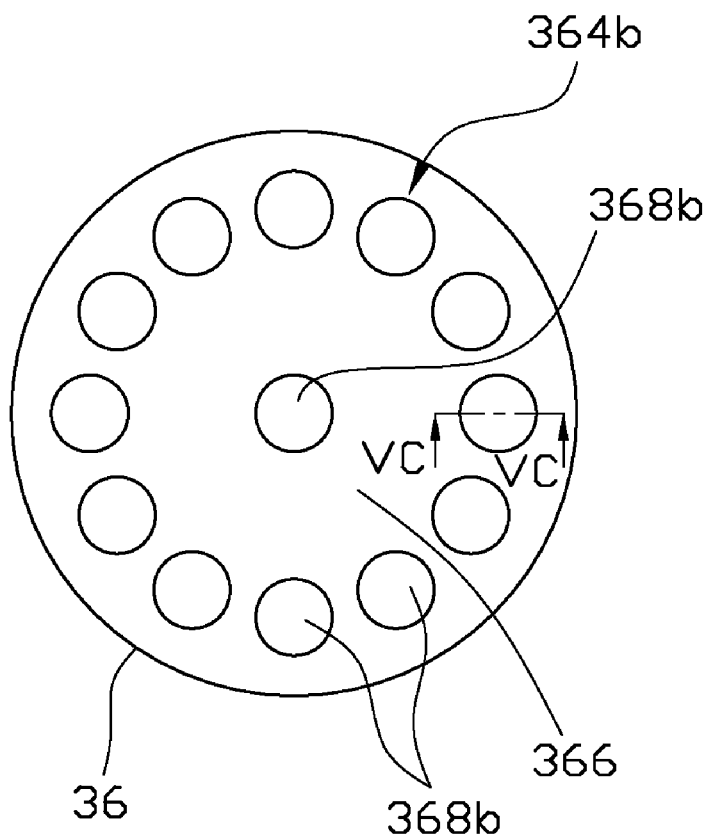
FIG. 5A is an enlarged, top plan view of an air discharge system of the contour measuring probe of FIG. 3, showing a second embodiment of the air discharge system.
Figure 5B:
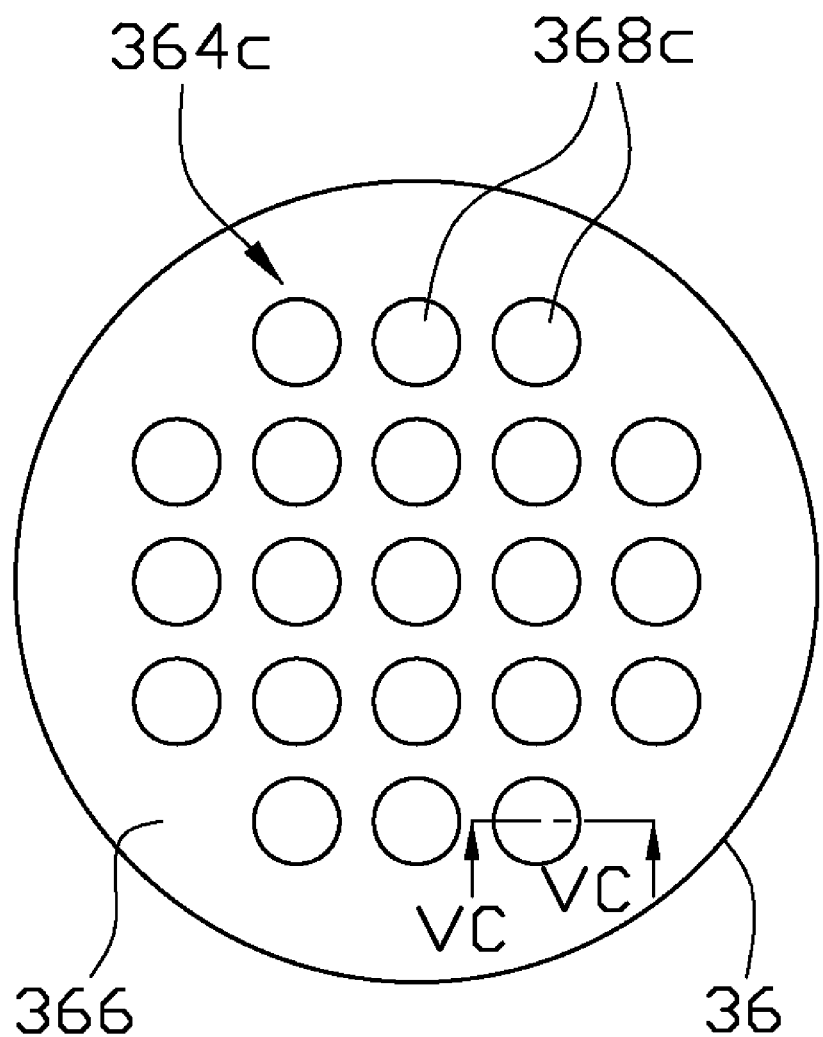
FIG. 5B is an enlarged, top plan view of an air discharge system of the contour measuring probe of FIG. 3, showing a third embodiment of the air discharge system.
Figure 5C:
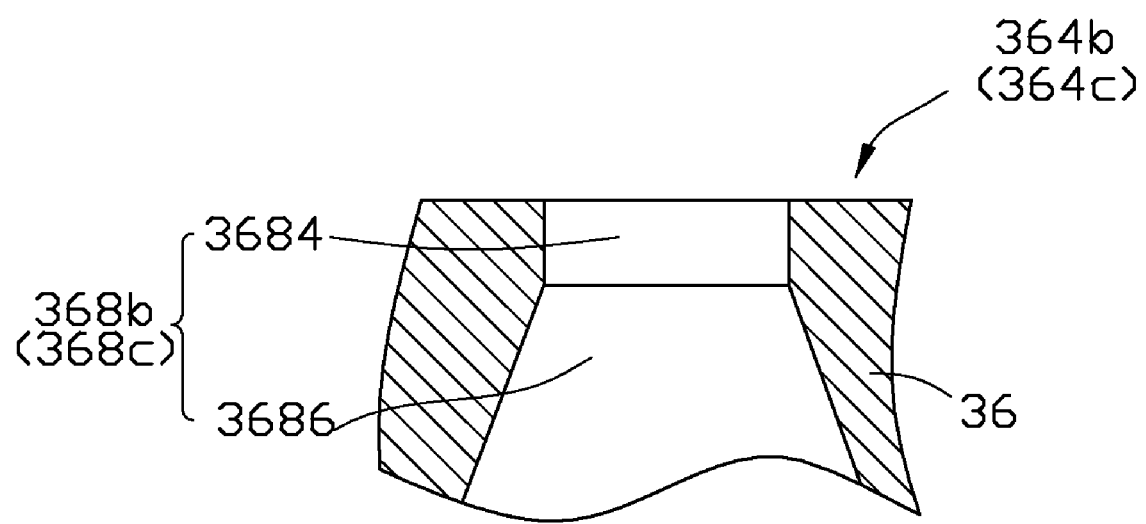
FIG. 5C is a cross-sectional view taken along line VC-VC of FIG. 5A and likewise taken along line VC-VC of FIG. 5B.

Referring to FIG. 5A and FIG. 5C, a second embodiment of an air discharge system 364b includes a central air eject hole 368b defined in the cylinder base 366 of each driving member 36, and a plurality of peripheral air eject holes 368b defined in the cylinder base 366 and surrounding the central air eject hole 368b. Each air eject hole 368b defines a top cylindrical portion 3684 and a frustum portion 3686. The frustum portion 3686 intercommunicates with the top cylindrical portion 3684 and the cavity 360. A diameter of the top cylindrical portion 3684 is equal to a smallest diameter of the frustum portion 3686. The frustum portion 3686 defines a conical frustum shape, with a radius of the conical frustum gradually decreasing from the cavity 360 to the top cylindrical portion 3684. Thus, air can flow smoothly out of the driving member 36 through the air eject holes 368b of the air discharge system 364b.

Referring to FIG. 5B and FIG. 5C, a third embodiment of an air discharge system 364c includes a plurality of air eject holes 368c defined in the cylinder base 366 of each driving member 36. The air eject holes 368c are formed in a regular array. The air eject holes 368c may each be configured the same as the air eject holes 368b. Alternatively, the air eject holes 368a, 368b, 368c may also be configured with cylindrical shaped.

Figure 6A:
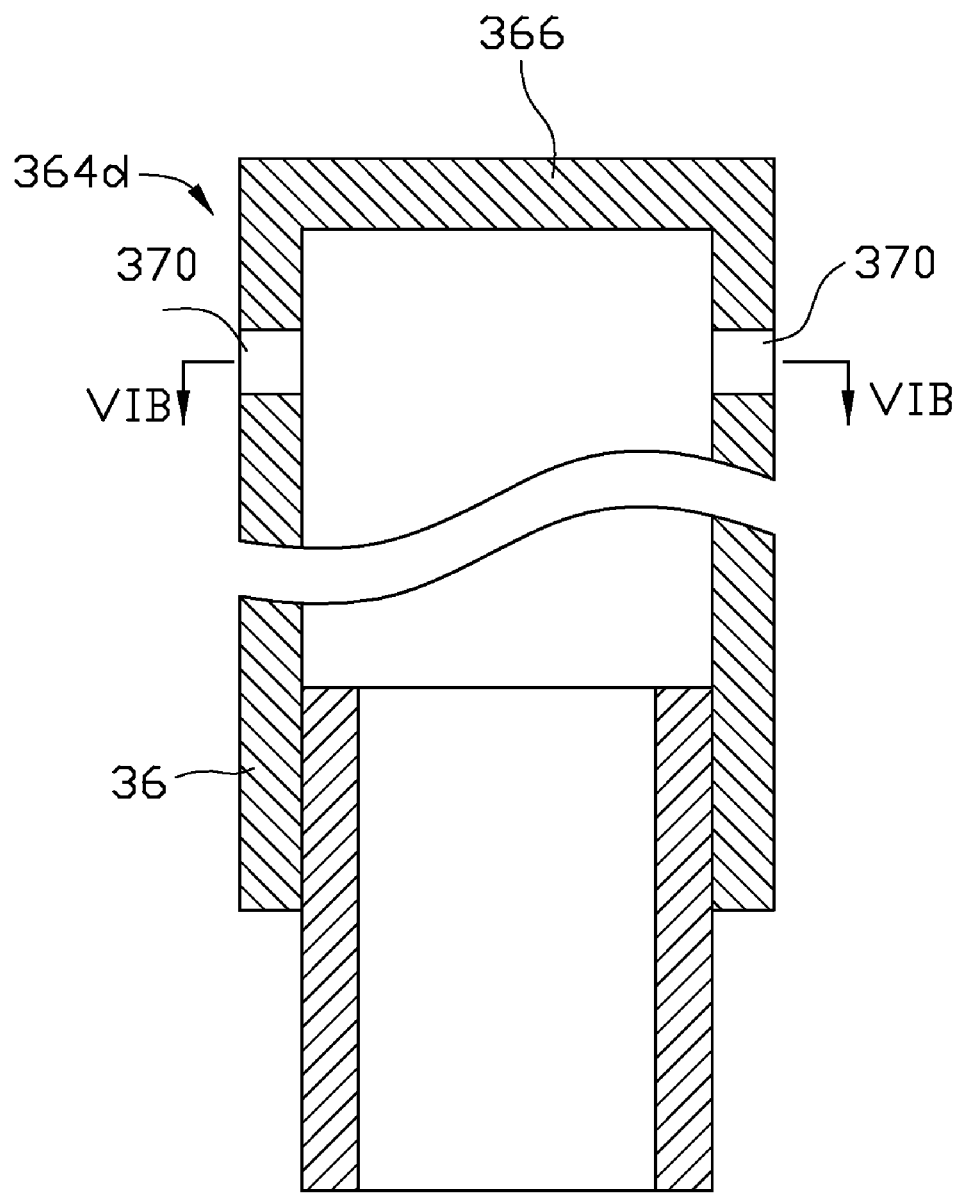
FIG. 6A is an enlarged, abbreviated view corresponding to one of the driving members and part of a corresponding one of the pipes of FIG. 3, showing part of a fourth embodiment of an air discharge system that can be employed in the contour measuring probe of FIG. 3.
Figure 6B:
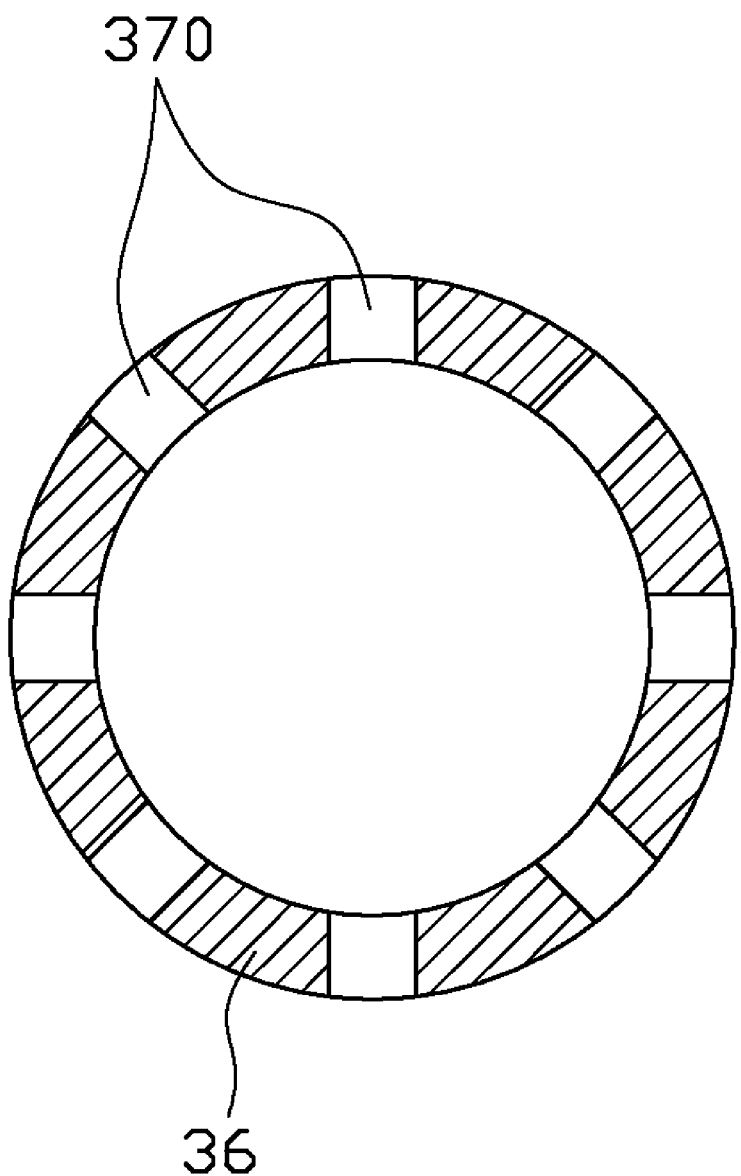
FIG. 6B is a cross-sectional view corresponding to line VIB-VIB of FIG. 6A.

Referring to FIG. 6A and FIG. 6B, a fourth embodiment of an air discharge system 364d includes a plurality of cylindrical air eject holes 370 defined in a sidewall of each driving member 36. In particular, the air eject holes 370 may be defined adjacent to the cylinder base 366 of the driving member 36, in positions where the air eject holes 370 are exposed outside of the second frame 42 and always exposed outside of the guide 32. The air eject holes 370 may be arranged in a ring and evenly spaced apart. Each of the air eject holes 370 is cylindrical. Alternatively, each of the air eject holes 370 may be configured to have the same shape as the air eject holes 368b, 368c. The contour measuring probe 30 with the air discharge system 364d can tolerate harsh environments, because the cylinder bases 366 of the driving members 36 are completely closed.

Figure 7A:
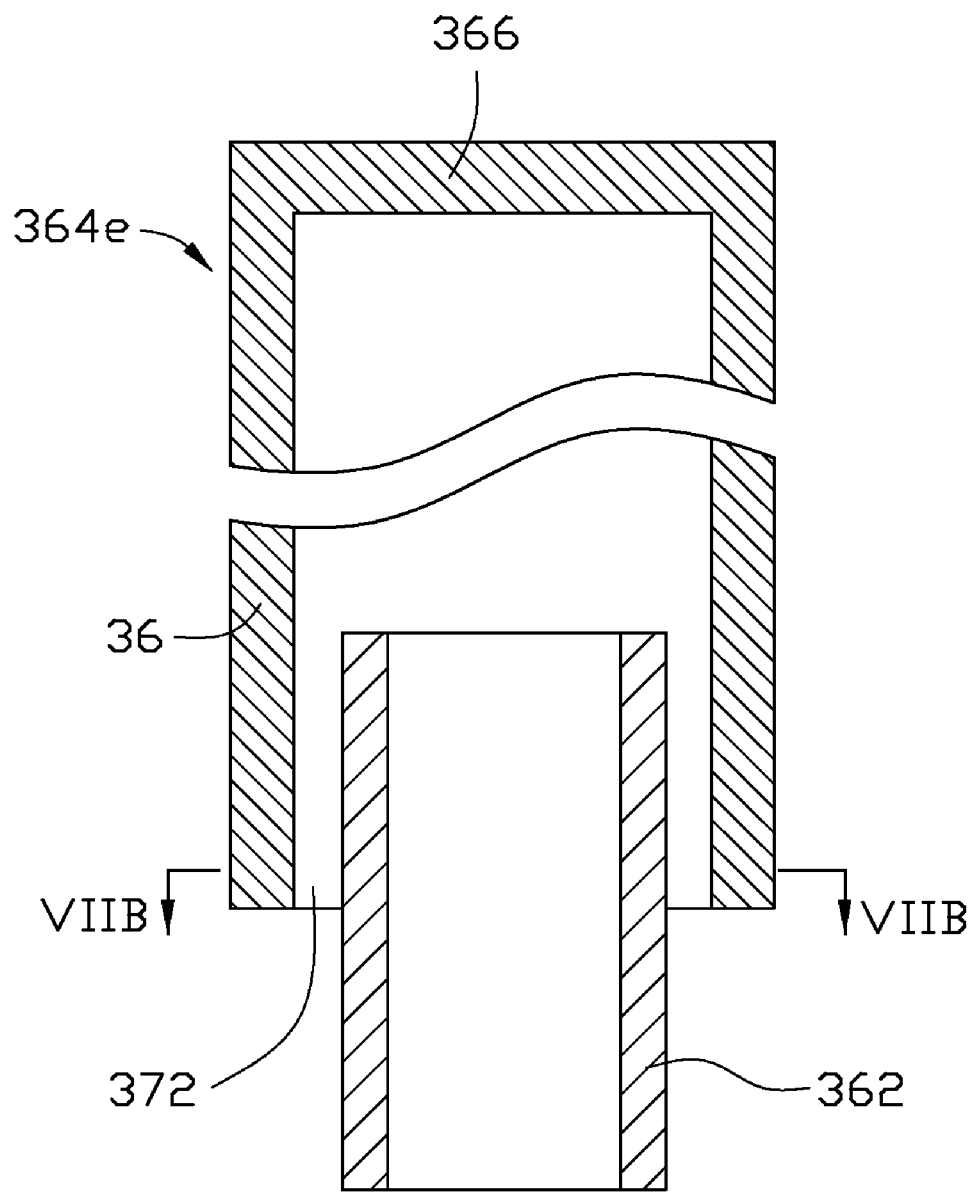
FIG. 7A is an enlarged, abbreviated view corresponding to one of the driving members and part of a corresponding one of the pipes of FIG. 3, showing a fifth embodiment an air discharge system that can be employed in the contour measuring probe of FIG. 3.
Figure 7B:
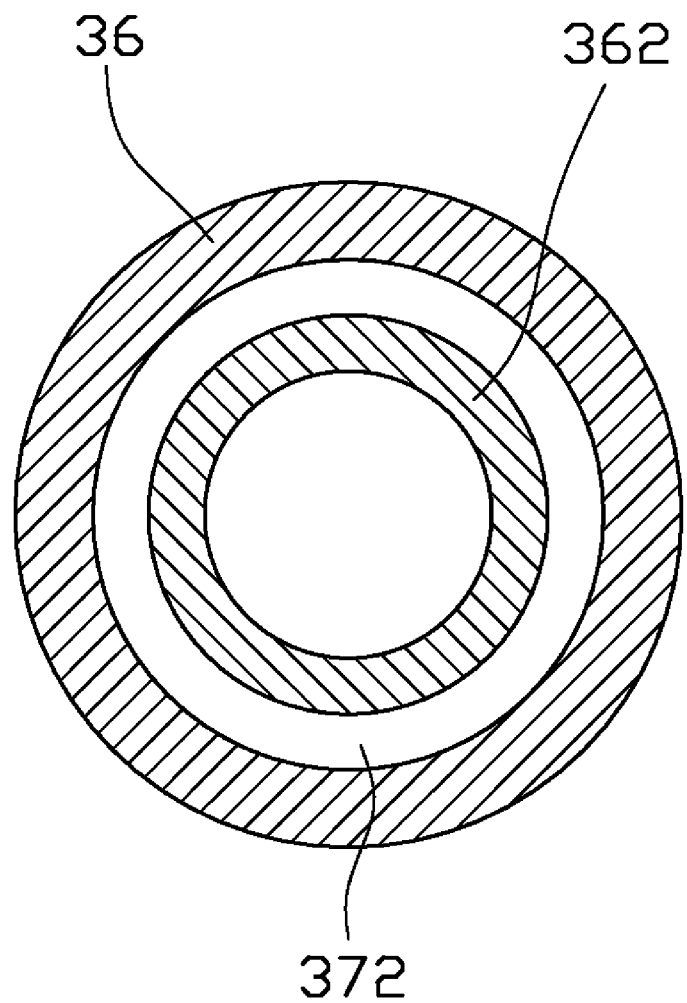
FIG. 7B is a cross-sectional view corresponding to line VIIB-VIIB of FIG. 7A.

Referring to FIG. 7A and FIG. 7B, a fifth embodiment of an air discharge system 364e is constituted by the gap 372 between each driving member 36 and the corresponding pipe 362. Similar to the contour measuring probe 30 with the air discharge system 364d of the fourth embodiment, the contour measuring probe 30 with the air discharge system 364e can also tolerate harsh environments. Further, the air discharge system 364 of each driving member 36 may be selected from any one or more of the above-described first through fifth embodiments. That is, the air discharge system 364 may be selected from any of the group consisting of the air eject hole 368a of the first embodiment, the air eject holes 368b of the second embodiment, the air eject holes 368c of the third embodiment, the air eject holes 370 of the fourth embodiment, and the gap 372 of the fifth embodiment.

When air is pumped into the cavities 360 of the driving members 36, air pressure in the cavities 360 pushes air out of the driving members 36 via the air discharge systems 364. That is, air is continuously pumped into the driving members 36 via the pipes 362 and continuously ejected out of the driving members 36 via the air discharge systems 364. Part of air pumped into the driving members 36 strikes the cylinder bases 366 of the driving members 36. Therefore, air pressure partially counter balances the gravitational force acting on the movable rack of the contour measuring probe 30. Thus, a measuring force of the tip extension 40 is reduced so that the contact tip 402 of the tip extension 40 and the object 204 are not easily deformed or damaged, thereby improving a precision of the contour measuring probe 30. Assuming that an area of an inside end surface of the cylinder base 366 of each driving member 36 is constant, then a value of a measuring force pushing the tip extension 40 is determined by an area of the air eject hole 368a, the air eject holes 368b, the air eject holes 368c, the air eject holes 370 and the gap 372 of each driving member 36. For example, in general, the measuring force decreases as the area of the air eject hole 368a, the air eject holes 368b, the air eject holes 368c, the air eject holes 370, and the gap 372, increases. In addition, a pressure inside the cover 302 is kept higher than that of the environment outside the cover 302, because the cover 302 and the base 31 is filled with the air ejected out of the air bearings 342 and the driving members. Thus, dust and other particles are prevented from entering the cover 302 through any openings thereof.

Figure 8:
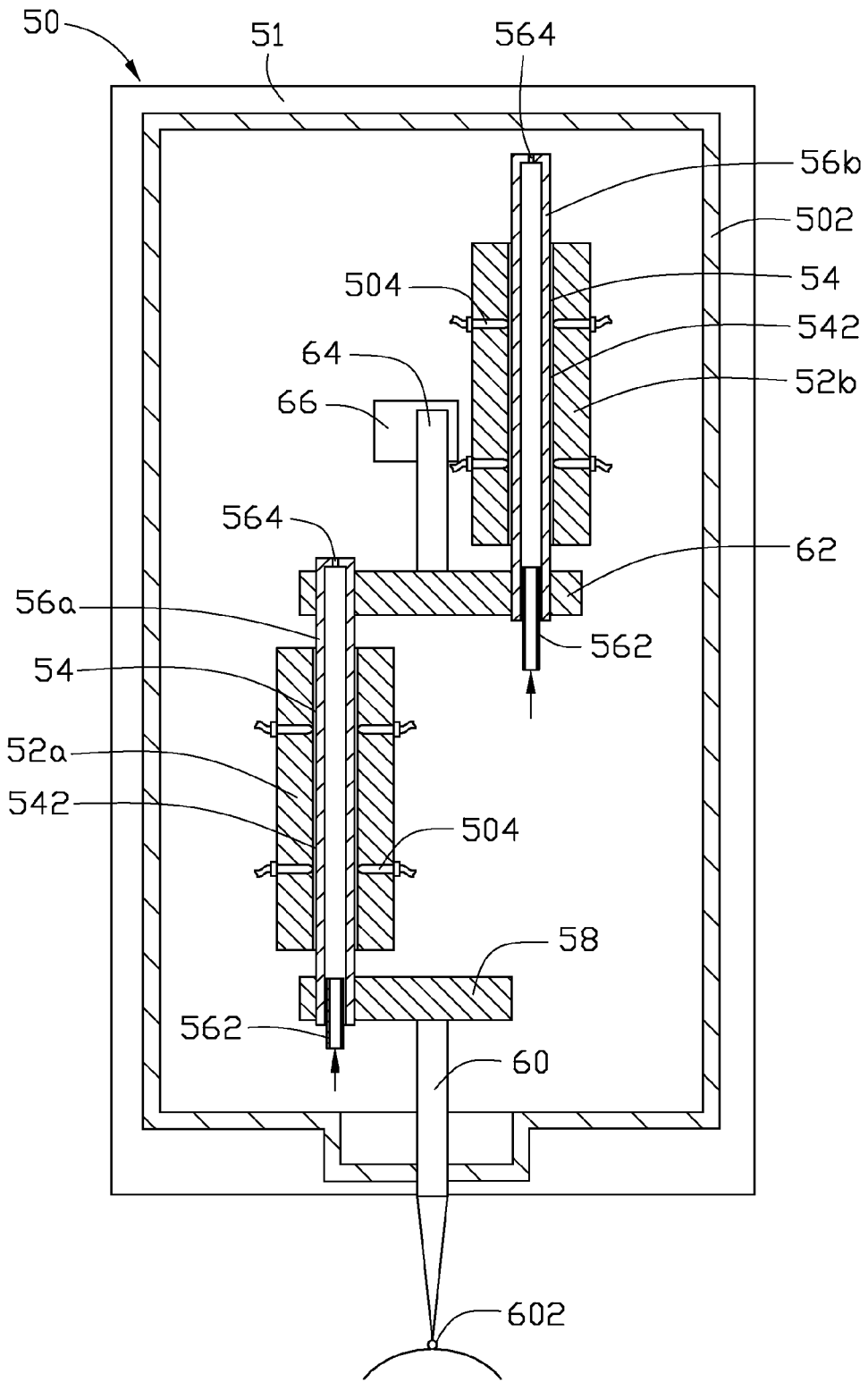
FIG. 8 is a top plan, cross-sectional view of a contour measuring probe in accordance with a third embodiment of the present invention.

Referring to FIG. 8, a contour measuring probe 50 of a third embodiment of the present invention includes a base 51, two guides 52a, 52b, two driving members 56a, 56b, a first frame 58, a tip extension 60, a second frame 62, a linear measuring scale 64, a displacement sensor 66, a cover 502, a plurality of tubes 504, and two pipes 562. In alternative embodiments, the contour measuring probe 50 may include only one driving member 56a, 56b or more than two driving members 56a, 56b. In such cases, there may be only one pipe 562 or more than two pipes 562.

The guides 52a, 52b are mounted securely on the base 51. The guides 52a, 52b are spaced apart from and parallel to each other. Each guide 52a, 52b defines a chute 54 for receiving the corresponding driving member 56a, 56b. An air bearing is formed between the driving member 56a and the guide 52a, and an air bearing 542 is formed between the driving member 56b and the guide 52b. The contour measuring probe 50 is similar in principle to the contour measuring probe 30 of the second embodiment, except that the guides 52a, 52b offset each other. That is, the guide 52a is set at a bottom portion of the base 51, and the guide 52b is set at a top portion of the base 51. The contour measuring probe 50 includes a pair of air discharge systems 564, which are substantially the same as the air discharge systems 564 of the contour measuring probe 30. Because the guides 52a, 52b offset each other, the guides 52a, 52b in combination hold the driving members 56a, 56b along a greater length as measured along a direction coinciding with an axis of movement of the tip extension 60, compared with a corresponding length along which the guide 32 holds the tip extension 40 in the contour measuring probe 30. Thereby, the tip extension 60 can move very steadily forward and backward with little or no lateral displacement.

Figure 9:
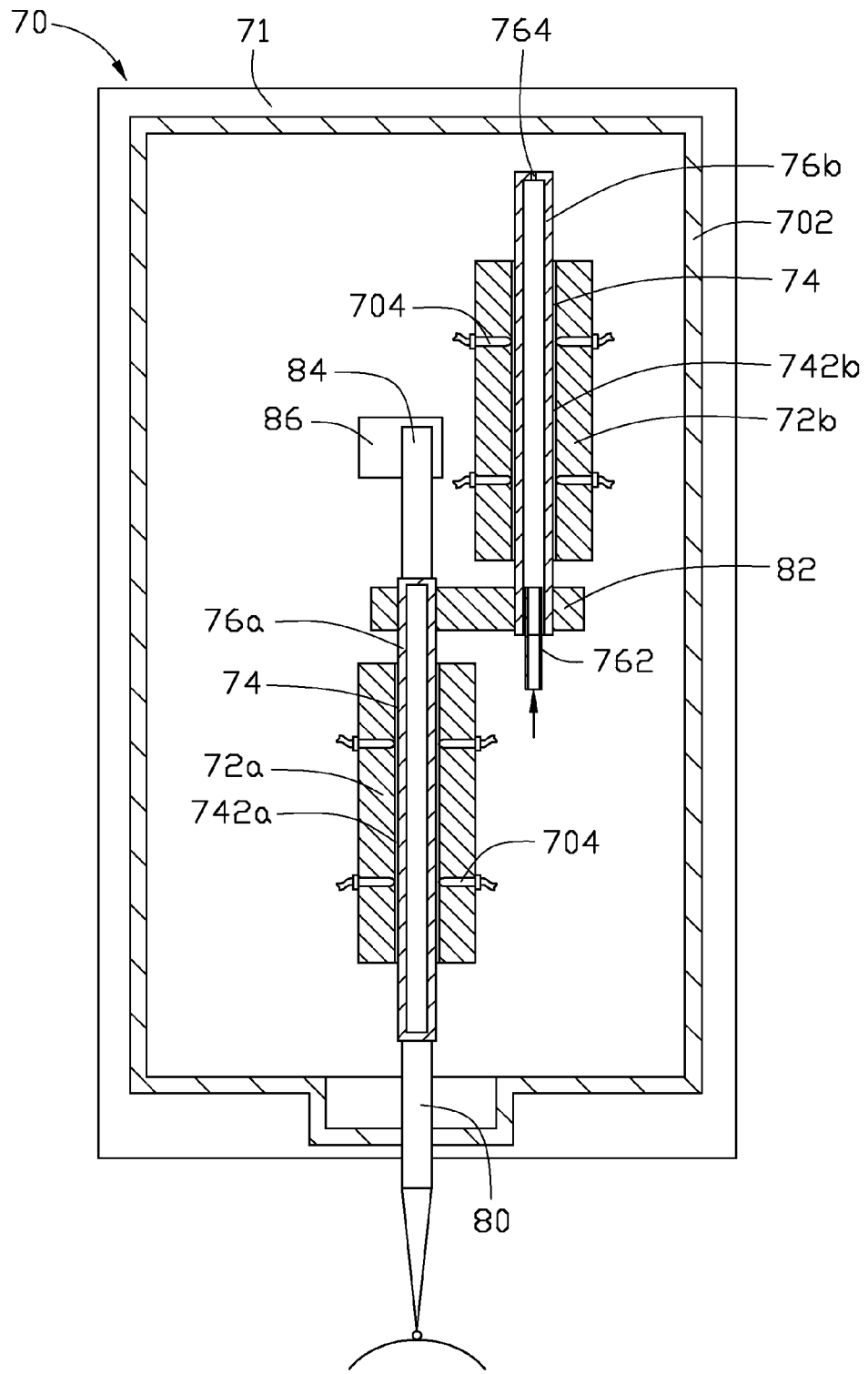
FIG. 9 is a top plan, cross-sectional view of a contour measuring probe in accordance with a fourth embodiment of the present invention.

Referring to FIG. 9, a contour measuring probe 70 of a fourth embodiment of the present invention includes a base 71, two guides 72a, 72b, two driving members 76a, 76b, a tip extension 80, a frame 82, a linear measuring scale 84, a displacement sensor 86, a cover 702, a plurality of tubes 704, and a pipe 762. The driving members 76a, 76b, the tip extension 80, the frame 82, the tubes 704, and the linear measuring scale 84 corporatively form a movable rack (not labeled). A gravitational force acting on the movable rack is regarded as a measuring force of the contour measuring probe 70. The gravitational force acting on the movable rack pushes the tip extension 80 to move towards an object.

The guides 72a, 72b are mounted securely on the base 71. The guides 72a, 72b are spaced apart from and parallel to each other. Each of the guides 72a, 72b defines a chute 74 for receiving the corresponding driving member 76a, 76b. An air bearing 742a is formed between the driving member 76a and the guide 72a, and an air bearing 742b is formed between the driving member 76b and the guide 72b. The contour measuring probe 70 is similar in principle to the contour measuring probe 50, except that no air is pumped into the driving member 72a, and the tip extension 80 is fixed directly to the driving member 76a. Because the guides 72a, 72b offset each other, for reasons similar to those described above in relation to the contour measuring probe 50, the tip extension 80 of the contour measuring probe 70 can move very steadily upward and downward with little or no lateral displacement. Further, the contour measuring probe 70 is simpler than the contour measuring probe 50 and the contour measuring probe 30, because only the one driving member 76b is filled with air.

In alternative embodiments, the pipe 762 may be omitted. In such cases, the tubes 704 are obliquely disposed in the guides 72a, 72b relative to an axis of the driving members 76a, 76b. An angle defined by extension directions of the tubes 704 relative to the axis of the driving members 76a, 76b is in a range from greater than 0 degree to less than 90 degrees. When air is pumped into guides 72a, 72b and applies a force on a sidewall of the driving members 76a, 76b via the tubes 704, the force partially counter balances the gravitational force acting on the movable rack of the contour measuring probe 70.

The contour measuring probes 10, 30, 50, 70 are all vertical type measuring devices. Because the contour measuring probes 10, 30, 50, 70 each has driving members 16, 36a, 36b, 56a, 56b, 76a, 76b, the tip extensions 20, 40, 60, 80 effectively cannot move in directions other than a direction parallel to axes of the driving members 16, 36a, 36b, 56a, 56b, 76a, 76b, i.e. the direction of the gravity. In typical use of the contour measuring probes 10, 30, 50, 70, the driving members 16, 36a, 36b, 56a, 56b, 76a, 76b, are oriented vertically.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A contour measuring probe, comprising:
   at least one guide, the at least one guide defining at least one chute,
   a movable rack having:
   a tip extension for touching a surface of an object, the tip extension being linearly movable relative to the at least one guide; and
   at least one driving member partly finning through the at least one guide and linearly slidable in the at least one guide, wherein a gravitational force acting on the movable rack pushes the tip extension to move towards the object, the at least one driving member is received in the at least one chute, two ends of the at least one driving member protrude out from two ends of the at least one chute respectively, and a gap is defined between the at least one driving member and the at least one guide so that an air bearing is formed between the at least one driving member and the at least one guide when air is pumped into the gap, at least part of the air pumped into the gap being ejected out of the at least one guide by the at least one chute;
   a counter-balancing mechanism for partially counter balancing the gravitational force acting on the movable rack;
   a linear measuring scale configured to display values of displacements of the tip extension, the linear measuring scale being fixed relative to one of the at least one guide and the tip extension; and
   a displacement sensor configured to detect and read the displacement values of the tip extension displayed by the linear measuring scale, the displacement sensor being fixed relative to the other one of the at least one guide and the tip extension.

2. The contour measuring probe as claimed in claim 1, wherein the counter-balancing mechanism is a resilient member generating a resilient force opposite to the gravitational force acting on the movable rack.

3. The contour measuring probe as claimed in claim 1, wherein the counter-balancing mechanism includes at least one pipe, the at least one driving member comprises a cavity, an open end and an opposite cylinder base, the at least one pipe is partially received in the cavity of the at least one driving member at the open end, the at least one driving member is slidable relative to the at least one guide, a flux of air pumped into the at least one driving member via the at least one pipe pushes the movable rack in a direction opposite to the gravitational force acting on the movable rack.

4. The contour measuring probe as claimed in claim 3, further comprising an air discharge system, the air discharge system comprises at least one air eject hole communicating with the cavity of the at least one driving member with an outside of the at least one driving member.

5. The contour measuring probe as claimed in claim 4, wherein the air discharge system comprises an air eject hole defined in the cylinder base of the at least one driving member, the air eject hole comprises a top cylindrical portion and a frustum portion, the top cylindrical portion has a diameter equaling to a smallest diameter of the frustum portion, the frustum portion intercommunicates with the top cylindrical portion and the cavity of the at least one driving member, the frustum portion has a diameter gradually decreasing from the cavity to the top cylindrical portion, whereby air can flow smoothly out of the at least one driving member through the air eject hole of the air discharge system.

6. The contour measuring probe as claimed in claim 4, wherein the air discharge system comprises a plurality of air eject holes defined in the cylinder base of the at least one driving member, a central air eject hole is defined in a center and other air eject holes surround the central air eject hole, each air eject hole comprises a top cylindrical portion and a frustum portion, the top cylindrical portion has a diameter equaling to a smallest diameter of the frustum portion, the frustum portion intercommunicates with the top cylindrical portion and the cavity of the at least one driving member, the frustum portion has a diameter gradually decreasing from the cavity to the top cylindrical portion, whereby air can flow smoothly out of the at least one driving member through the air eject hole of the air discharge system.

7. The contour measuring probe as claimed in claim 4, wherein the air discharge system comprises a plurality of air eject holes defined in the at least one driving member, each air eject hole comprises a top cylindrical portion and a frustum portion, the top cylindrical portion has a diameter equaling to a smallest diameter of the frustum portion, the frustum portion intercommunicates with the top cylindrical portion and the cavity of the at least one driving member, the frustum portion has a diameter gradually decreasing from the cavity to the top cylindrical portion, whereby air can flow smoothly out of the at least one driving member through the air eject hole of the air discharge system.

8. The contour measuring probe as claimed in claim 4, wherein the air discharge system comprises a plurality of air eject holes defined in a sidewall of the at least one driving member.

9. The contour measuring probe as claimed in claim 4, wherein the air discharge system is a combination consisting of any of the at least one air eject hole defined in the cylinder base of the at least one driving member, at least one air eject hole defined in a sidewall of the at least one driving member, and a gap defined between the at least one driving member and the pipe.

10. The contour measuring probe as claimed in claim 4, further comprising a base and a pipe holder, the at least one guide and the pipe holder are mounted securely on the base, and the pipe holder holds the at least one pipe in position.

11. The contour measuring probe as claimed in claim 10, further comprising a cover, the cover engaging on the at least one guide, the at least one driving member, the linear measuring scale, the displacement sensor, and the at least one pipe, the cover defines an opening for allowing a part of the tip extension to extend out therefrom.

12. The contour measuring probe as claimed in claim 10, wherein the at least one guide is one guide, the at least one driving member is two or more driving members, and the at least one pipe is two pipes, the guide defines two or more chutes therein, the chutes are spaced apart from and aligned parallel to one another, each pipe is partially received in the cavity of each driving member.

13. The contour measuring probe as claimed in claim 12, further comprising a first frame and a second frame, the cylinder base of the driving members and the tip extension are fixed to the first frame, the open ends of the driving members and one of the linear measuring scale and the displacement sensor are fixed to the second frame.

14. The contour measuring probe as claimed in claim 10, wherein the at least one guide comprises a first guide and a second guide, wherein the at least one driving member is two driving members, each guide defines a chute for receiving one of the driving members, the first and second guides offset each other.

15. The contour measuring probe as claimed in claim 14, further comprising a first frame, a second frame, the at least one pipe is two pipes, the open end of one of the driving members, the cylinder base of another one of the driving members, one of the linear measuring scale and the displacement sensor are fixed to the second frame, the open end of the another driving member and the tip extension are fixed to the first frame, each driving member receives a respective one of the two pipes.

16. The contour measuring probe as claimed in claim 14, further comprising a frame, wherein the at least one pipe is a single pipe, the open end of the first driving member, one end of the second driving member, and one of the linear measuring scale and the displacement sensor are fixed to the frame, the first driving member receives the pipe.

17. A contour measuring probe, comprising:

a movable rack including a tip extension for touching a surface of an object, the tip extension being pushed to move towards the object under a gravitational force acting on the movable rack; and a counter-balancing mechanism for partially counter balancing the gravitational force acting on the movable rack;

wherein the movable rack further comprises at least one guide and at least one driving member partly running through the at least one guide and linearly slidable in the at least one guide; the counter-balancing mechanism comprises at least one pipe, the at least one driving member comprises a cavity, an open end and an opposite cylinder base, the at least one pipe is partially received in the cavity of the at least one driving member at the open end, the at least one driving member is slidable relative to the at least one guide, a flux of air pumped into the at least one driving member via the at least one pipe pushes the movable rack in a direction opposite to the gravitational force acting on the movable rack.

* * * * *